Patented July 24, 1923.

1,462,991

UNITED STATES PATENT OFFICE.

ROBERT L. TAYLOR, OF MIDWAY, PENNSYLVANIA, ASSIGNOR, BY MESNE ASSIGNMENTS, OF ONE-HALF TO CHARLES L. McKENZIE, OF PITTSBURGH, PENNSYLVANIA.

BUILDING BRICK AND PROCESS OF MAKING SAME.

No Drawing.   Application filed March 31, 1922.   Serial No. 548,520.

*To all whom it may concern:*

Be it known that I, ROBERT L. TAYLOR, a citizen of the United States, residing at Midway, in the county of Washington and State of Pennsylvania, have invented certain new and useful Improvements in Building Bricks and Processes of Making the Same, of which the following is a specification.

My invention is an improvement in the manufacture of building brick or blocks of various forms for use in walls, sewers, pavements, or wherever durability and resistance to strains, weather, and heat are required.

It contemplates the use of a particular kind of blast furnace slag known as manganese slag, by reason of certain inherent qualities contributing to its successful use in a special degree, when utilized for the manufacture of building units, in the manner hereinafter more fully described.

As is well known, ordinary blast furnace slag, incident to the making of the usual Bessemer or other pig iron as a by-product, is now largely utilized as a base for the manufacture of concrete, when crushed and mixed with a suitable proportion of lime and cement, with any alumina present, and enough water to form a plastic mass.

Ordinarily, however, the proportion of silica derived from Bessemer ore, combined with the limestone, is greater, and the proportion of alumina, combined with the limestone, is smaller than desirable for the best results, in utilizing ordinary slag. At the same time, the proportion of lime and alumina is not sufficient to ensure the proper bond without the addition of supplemental quantities of lime or cement in the mixture, thereby greatly adding to the ultimate cost.

On the other hand, blast furnace slag derived from the smelting of ferro manganese ore in the blast furnace contains in itself constituents in substantially the proper proportions, so that when properly treated, the resulting blocks, etc., as made by my improved process, are produced without the necessity of any supplemental bonding material, or of a very small proportion only, for certain special uses. A typical analysis of ferro manganese slag suitable for use in my improved process and for the production of the resulting product, is as follows:

| | |
|---|---|
| Silica | 25.10% to 28.00% |
| Alumina | 23.40% to 24.20% |
| Lime | 27.04% to 29.47% |
| Magnesia | 7.68% to 7.96% |
| Manganese dioxide | 6.60% to 12.40% |

The manganese content of the slag should be substantial, i. e., not less than 3% of the whole.

In utilizing manganese slag of the above constituency, and substantially corresponding proportions as to analysis of the several main elements, the mass is crushed or ground preferably into fine particles of not larger than say substantially 100 mesh screen, but I do not limit myself to this grading of material, as much coarser material may be used and give highly satisfactory results. The ground slag is then placed in a grinding or mixing mill, and further ground, if necessary. A proper proportion of water is added, depending on the amount of moisture already present, and thoroughly mixed to produce a plastic mass. The simultaneous mixing with water and the grinding operation is important in contributing to a very thorough and intimate integration of the several elements, not only mechanically, but in order to ensure very even distribution of the large lime content throughout the batch, to ensure the final desirable compact chemical association of the particles under pressure. This operation is continued until a coherent mass of proper consistency is produced.

Thus, in order to test for sufficient treatment, if a sample mass is taken in the hand and packed together and pressed by the thumb, if it merely breaks apart and does not crumble, the grinding and mixing process has reached the final stage. If it crumbles, the grinding is not sufficient, and should be continued further. If it is too plastic and does not break at all, the moisture is too great, and the operation should be continued further.

When the consistency is found to be proper, and sufficiently stiff to handle without crumbling, portions of the batch are in the molding cavities of b making machines, of whatever final form is desired, and each unit is subjected to very great pressure, say from 80 to 100 tons. The units in such finally compressed form are then removed from the press molds and introduced into a suitable hardening chamber in the presence of steam and under steam pressure, for say not less than eight hours. They are then removed and are ready for the market, and may be stored in the open air, or elsewhere.

The silica and alumina content of the mixture provide the proper substance or body for the resulting block, while the proportion of lime naturally present in the ferro manganese slag forms the desirable binding hold to very firmly associate and hold the mass together.

The magnesia and manganese constituents, with these, supplement the body portion and give a definite additional strength, with a certain degree of desirable metallic character and lustre, all of which qualities are very desirable in building material of this kind.

The resulting bricks, blocks, or units of whatever form is desired will resist great crushing strains, or will withstand continuous temperatures of 2000° F.

They are suitable for building walls, sewers, street paving and similar uses, and have a low co-efficient of expansion and contraction. They may be utilized as tile, and by the addition of various coloring substances, are available for mosaic or other ornamental purposes. If desired for pavements, or wherever they are subjected to attrition or wear, a slight proportion of cement or lime, say 3%, may be added to the mixture, but ordinarily such will not be required.

Having described my invention, what I claim is:

1. The process of making building blocks or the like consisting in first crushing ferro manganese slag containing not less than 3% of manganese to a proper consistency, then further grinding and mixing the crushed mass with water to a suitable consistency, then pressing the same in molds, and drying, substantially as set forth.

2. The process of making building blocks or the like consisting in first crushing ferro manganese slag to a proper consistency, mixing the mass with water to form an intimately associated plastic mixture, holding unitary portions under pressure, and then subjecting the compressed and molded units to steam and drying them, substantially as set forth.

3. A building block or the like composed of ferro manganese slag containing not less than 3% of manganese treated in the manner described.

4. A building block or the like composed of ferro manganese slag treated in the manner described, and containing silica, alumina, lime, magnesia, and manganese in substantially the proportions stated after having been crushed, mixed with water, and pressed to form.

5. The process of making building blocks or the like consisting in grinding ferro manganese slag containing not less than 3% of manganese forming a plastic mass therefrom with water, molding the mass into blocks, and allowing the blocks to harden.

6. The process of making building blocks or the like consisting in the grinding of a furnace slag containing not less that 3% of manganese, inherently having a sufficiently high alumina and lime content to cause the same to harden when made into a plastic mass, mixing the mass into blocks and allowing them to harden.

7. A slag building block or the like containing manganese in the proportion of at least 3%.

8. A building block or the like composed of a furnace slag having a substantial manganese content.

9. A building block or the like composed principally of ferro manganese slag.

In testimony whereof I hereunto affix my signature.

ROBERT L. TAYLOR.